(12) United States Patent
Turner

(10) Patent No.: US 9,719,568 B2
(45) Date of Patent: Aug. 1, 2017

(54) ALL WHEEL DRIVE HYDRAULIC FLUID PRESSURE SENSOR COMPENSATION ALGORITHM

(71) Applicant: Honda Motor Co., Ltd., Minato-ku, Tokyo (JP)

(72) Inventor: Steven P. Turner, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 147 days.

(21) Appl. No.: 14/827,058

(22) Filed: Aug. 14, 2015

(65) Prior Publication Data

US 2017/0045103 A1 Feb. 16, 2017

(51) Int. Cl.
*F16H 59/62* (2006.01)
*F16D 48/06* (2006.01)

(52) U.S. Cl.
CPC ........... *F16D 48/066* (2013.01); *F16H 59/62* (2013.01); *F16D 2500/10431* (2013.01); *F16D 2500/1107* (2013.01); *F16D 2500/3024* (2013.01); *F16D 2500/7044* (2013.01); *F16H 2342/00* (2013.01); *F16H 2342/04* (2013.01)

(58) Field of Classification Search
None
See application file for complete search history.

(56) References Cited

U.S. PATENT DOCUMENTS

| 6,834,218 B2 | 12/2004 | Meyers et al. |
|---|---|---|
| 7,085,642 B2 | 8/2006 | Samuel et al. |
| 8,285,463 B2 | 10/2012 | Moses et al. |
| 8,583,334 B2 | 11/2013 | Martin et al. |
| 2003/0033075 A1* | 2/2003 | Yasui ................ F02D 41/1402 701/109 |
| 2005/0076958 A1* | 4/2005 | Foster ................ F15B 21/005 137/596 |
| 2012/0265471 A1 | 10/2012 | Hess et al. |
| 2013/0197781 A1 | 8/2013 | Shin et al. |

FOREIGN PATENT DOCUMENTS

EP   1566560 A1   8/2005

* cited by examiner

*Primary Examiner* — Justin Holmes
(74) *Attorney, Agent, or Firm* — Arent Fox LLP

(57) ABSTRACT

A method may be provided for correcting a raw signal supplied by a pressure sensor in an all wheel drive system having a hydraulic pump and a hydraulic fluid. The method may include measuring the raw signal supplied by the pressure sensor, determining when the all wheel drive system is in a state where the hydraulic fluid is at a known pressure determined independently from the pressure sensor, determining a new zero-point offset by comparing the raw signal to a voltage value associated with the known pressure, and creating a corrected voltage signal by adjusting the raw signal based on the new zero-point offset. This corrected voltage signal may be converted into a pressure reading for controlling the all wheel drive system.

20 Claims, 5 Drawing Sheets

ALL WHEEL DRIVE HYDRAULIC FLUID PRESSURE SENSOR COMPENSATION ALGORITHM

BACKGROUND

The subject matter disclosed herein relates to a method for correcting or calibrating a pressure sensor used in measuring hydraulic fluid pressure in an all wheel drive system for a vehicle.

An all wheel drive system may be equipped, for example, in variety of vehicle types, such as cars, SUVs, trucks, cross-overs, and construction machinery. The all wheel drive system is a drive train system that may include a pair of differentials, with one differential located between the front drive half shafts and a second differential located between the rear drive half shafts. The differentials allow the left and right wheels attached to both the front and rear differentials to rotate at different speeds but still allow both wheels to transfer torque. A slip device in the all wheel drive system, such as an all wheel drive clutch, may allow the front and rear differentials to spin at different speeds, thus allowing all four wheels to rotate at different speeds from one another while allowing all four wheels to drive the vehicle, thereby providing improved traction. In some situations the all wheel drive system may be deactivated by, for example, disengaging the rear drive half shafts from the drive train system by disengaging the all wheel drive clutch. Alternatively, if the all wheel drive clutch is fully engaged, then the front and rear differentials may spin at the same speeds.

A linear hydraulic control device, relying upon hydraulic pressure, may be used to apply force to the all wheel drive clutch to selectively engage and disengage the clutch. This enables control over the distribution of torque to the rear differential and the rear drive half shafts. The all wheel drive clutch may be fully or partially engaged by varying the hydraulic fluid pressure to reach or exceed an engagement pressure. This varying degree of clutch engagement may be used to vary the torque distribution to the rear wheels (e.g., more engagement may transfer more torque, while less engagement may transfer less torque) by allowing the all wheel drive clutch to slip at lower pressures and to lock at higher pressures. The hydraulic fluid pressure may be controlled using a hydraulic fluid pump turned by an electric motor. The hydraulic fluid pressure may be measured using a hydraulic fluid pressure sensor, which may measure the pressure of the hydraulic fluid using an internal diaphragm, and may output the measured pressure as a voltage signal.

A variety of factors may cause the readings of such a hydraulic fluid pressure sensor to vary, reducing the accuracy of the sensor. These factors may include variations in the temperature of the hydraulic fluid, variations in ambient atmospheric pressure (e.g., due to altitude changes or pressure fronts), variations in manufacturing between pressure sensors, and wear of the pressure sensor over time. These variations can result in erroneous readings that may result in an all wheel drive controller reading a pressure value that is greater than a maximum pressure value or less than a minimum pressure value, resulting in all wheel drive being incorrectly or ineffectively engaged or disengaged, or an error flag being set by the controller and displayed on the instrument cluster of the vehicle. Furthermore, inaccurate readings may result in excess hydraulic pressure being applied through the system, putting additional stresses on the system which may cause components to fail or wear out more quickly. Conversely, insufficient pressure may cause the clutch to not engage or to slip excessively, which may also cause components to wear out more quickly. The errors due to the variation between pressure sensors during manufacturing may stay the same throughout the life of the sensor, while errors due to the wear of the pressure sensor and all wheel drive system may slowly vary over time.

The largest fluctuation in the pressure signal error may come from changes in the temperature of the hydraulic fluid and from the atmospheric pressure during a single driving cycle. As the all wheel drive system is activated, the hydraulic fluid may heat up, for example, due to the hydraulic fluid pump and clutch activity. The temperature and the atmospheric pressure may constantly change as the temperature of the hydraulic fluid increases or as the vehicle increases or decreases in altitude, and may also vary due to weather changes. These errors may cause the hydraulic fluid pressure sensor to output a voltage that is higher or lower than ideal voltage used to represent a particular pressure value.

SUMMARY

In one embodiment, a system of controlling an all wheel drive system in a vehicle includes an atmospheric pressure sensor coupled to the vehicle, a pressure sensor configured to detect a hydraulic pressure of the all wheel drive system, and a controller. The controller is configured to determine whether the vehicle is in an idle stop state, when the vehicle is in an idle stop state, determine whether at least one predetermined testing condition is met, and, when the vehicle is in an idle stop state and the at least one predetermined testing condition is met, determine an atmospheric pressure using the atmospheric pressure sensor, measure a raw output from the pressure sensor, determine a zero-point offset based on the atmospheric pressure, the raw output, and a known pressure value present when the at least one predetermined testing condition is met, and create a corrected pressure reading using the zero-point offset and a second raw output from the pressure sensor.

In another embodiment, a system of controlling an all wheel drive system in a vehicle includes an atmospheric pressure sensor coupled to the vehicle, a pressure sensor configured to detect a hydraulic pressure of the all wheel drive system, and a controller. The controller is configured to determine whether the vehicle is in an idle stop state, when the vehicle is in an idle stop state, determine an atmospheric pressure using the atmospheric pressure sensor, measure a raw output from the pressure sensor, determine a zero-point offset based on the atmospheric pressure, the raw output, and a known pressure value present when the at least one predetermined testing condition is met, and create a corrected pressure reading using the zero-point offset and a second raw output from the pressure sensor.

In another embodiment, a method of controlling an all wheel drive system in a vehicle includes determining whether the vehicle is in an idle stop state, when the vehicle is in an idle stop state, determining whether at least one predetermined testing condition is met, and when the vehicle is in an idle stop state and the at least one predetermined testing condition is met, determining an atmospheric pressure using an atmospheric pressure sensor coupled to the vehicle, determining a raw output from a pressure sensor configured to detect a hydraulic pressure of the all wheel drive system, determining a zero-point offset based on the atmospheric pressure, the raw output, and a known pressure value present when the at least one predetermined testing condition is met, and determining a corrected pressure reading using the zero-point offset and a second raw output from the pressure sensor.

BRIEF DESCRIPTION OF THE DRAWINGS

The present disclosure is illustrated by way of examples and embodiments and is not limited by the accompanying figures, in which like reference numbers indicate similar elements. For simplicity and clarity of illustration, the drawing figures illustrate the general manner of construction, and details of well-known features and techniques may be omitted to avoid unnecessarily obscuring the invention. Elements in the figures are illustrated for simplicity and clarity and have not been necessarily drawn to scale. The figures together with the detailed description are incorporated and form part of the specification and serve to further illustrate examples, embodiments and the like, and explain various principles and advantages, in accordance with the present disclosure, where.

Other aspects and advantages of certain embodiments will become apparent upon consideration of the following detailed description, wherein similar structures have similar reference numerals.

DETAILED DESCRIPTION

Figure 1:
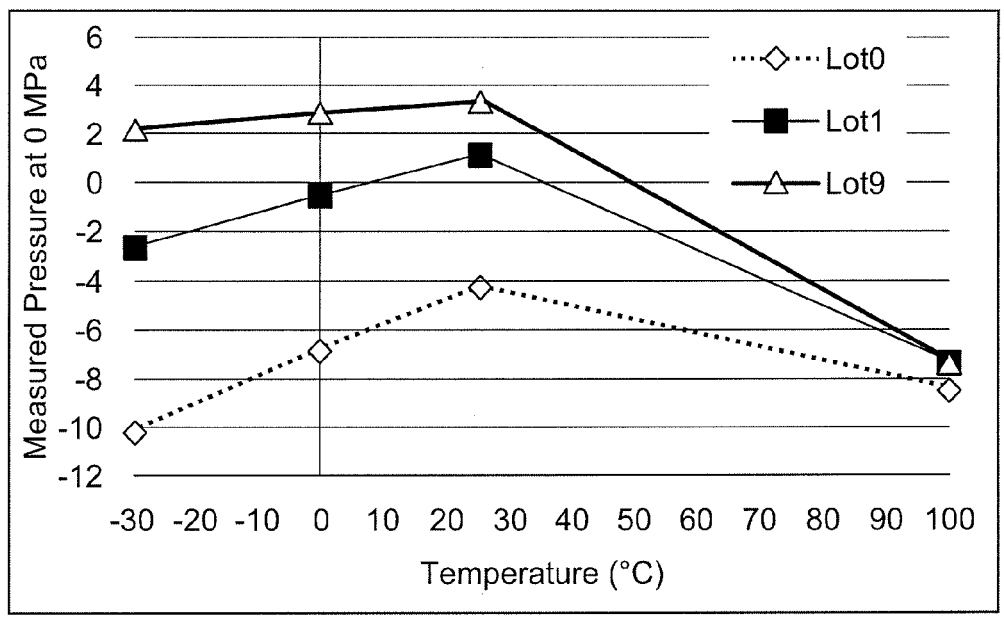
FIG. 1 is a chart showing the non-linear relationship between temperature and voltage offset for a pressure sensor.

The following detailed description is exemplary in nature and is not intended to limit the invention or the application and uses of the same. Furthermore, there is no intention to be bound by any expressed or implied theory presented in the preceding technical field, background, or the following detailed description.

The present disclosure provides an algorithm for controlling or operating an all wheel drive system that is arranged to compensate for offsets or errors that may arise within a hydraulic pressure sensor of the system. A variety of errors may be present in a non-recently calibrated pressure sensor (temperature, altitude, degradation over time, manufacturing inaccuracies—new part). Some of these errors will change frequently over time and can cause significant inaccuracies in the pressure readings, such as temperature and ambient pressure. These inaccuracies can cause a fault signal to be activated in the system, which will deactivate the all-wheel-drive system when it is not necessary (in particular due to high altitude pressure signal errors). In other cases, the inaccuracies can causes excessive wear on the components of the AWD system resulting for inaccurate pressure commands being issued to one or more of the system's clutches. This can result in improper operation of the vehicle's AWD system, possibly resulting in unwanted drag within the AWD system reducing overall vehicle efficiency.

The present system seeks to account for these errors at times when the sensor signal (voltage) is known, such as when the hydraulic pressure within the AWD system is zero (i.e., the AWD system is not activated). At such a time, the overall pressure of the AWD system should be known allowing for a difference between the known pressure reading and the pressure sensor's actual reading to be measured. Based upon those measurements, the system can then calculate an error or offset of the pressure sensor reading.

The offset can be calculated before the engine has been started because at that time the pressure sensor should give a known reading equivalent to zero pressure. But, because AWD is often engaged or disengaged while a vehicle is moving and the engine is running, the offset value can also be determined at times when the engine is running. In that case, the hydraulic pressure within the AWD system should be at a known steady state, such as when the hydraulic pump within the AWD system is not operating and has not operated for a sufficient length of time that the hydraulic pressure within the AWD system has steadied.

During operation, the present system calculates the pressure sensor reading offset by reading the sensor value when pressure should be zero (i.e., when the engine is off or the AWD is non-operative) and then uses any non-zero value measured in calculating the offset. The value can then be further compensated by applying offsets to compensate for ambient conditions, such as temperature and pressure. In one embodiment, the present system will not change the previously-calculated offset if the newly-calculated offset is greater than a maximum value or if the offset calculation process is interrupted (such as by activation of the AWD system). In the offset calculation is interrupted, the system may simply rely upon a previously-calculated pressure sensor reading offset value or may, alternatively, use an offset value of zero.

In some embodiments, to calculate the pressure sensor offset values, pressure sensor measurements are averaged over a period of time, immediately at power on during initialization of the system (i.e., before the engine is cranked) and during an idle stop event. In the present disclosure an idle stop refers to a period of time during which a vehicle would otherwise be idling and at a stop, during which a vehicle controller stops the vehicle's engine. Upon detecting a suitable re-start event (e.g., a vehicle operator removing their foot from the vehicle's brake pedal, pressing upon the vehicle's accelerator, or shifting into gear), the controller will restart the engine allowing the vehicle to be driven. The idle stop event can result in fuel savings as the vehicle's engine does not run while the vehicle is at a stop and without a need for power from the engine. Some systems that stop the vehicle's engine during an idle stop are referred to as "start-stop" or "stop-start" systems. After an idle stop event is detected, the system may then wait for a minimum amount of time after the commands to the oil pump motor and linear solenoids of the AWD have ceased to ensure residual oil pressure within the AWD is gone or near zero. In the case of detecting the power on event, no delay may be required. After the pressure sensor measurements are collected and averaged, the present system applies a correction factor to the averaged sensor voltage to obtain the ideal zero-point pressure of 0.5 volts. If the zero-point offset is greater than a limit, then the learning process may be disabled to allow failure detection to detect any problems. If engine cranking occurs during a learning process or if the AWD pumps are operated or solenoids driven to non-rest positions, the system stops the pressure offset learning process and the prior learned offset value is used instead or, alternatively, no pressure offset may be utilized.

Figure 6:
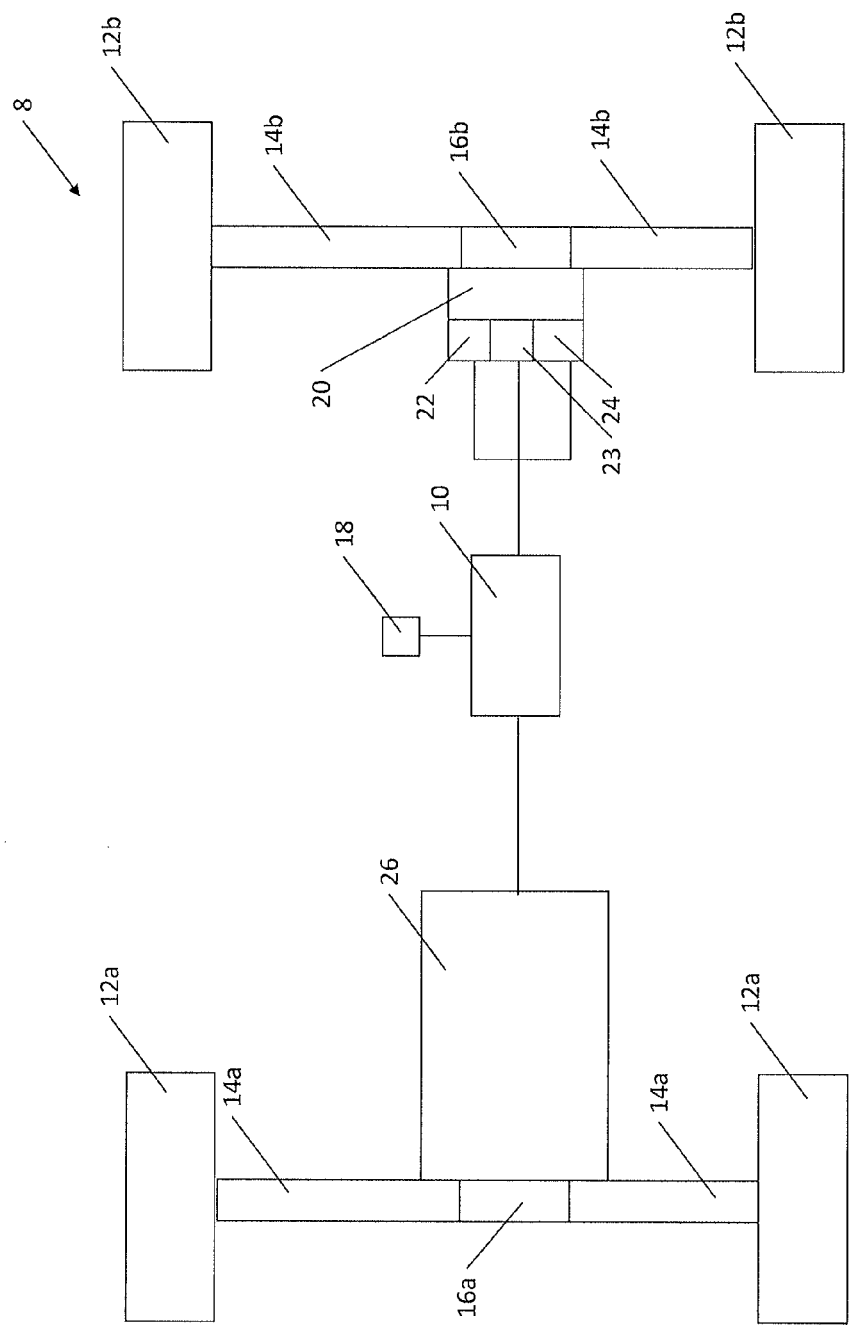
FIG. 6 is a block diagram showing components of the present all wheel drive system.

FIG. 6 is a block diagram showing components of an AWD system in accordance with the present disclosure. AWD system 8 is configured to drive front wheels 12a and rear wheels 12b of a vehicle. Front and rear wheels 12a and 12b are connected to front and rear drive shafts 14a and 14b which are, in turn, connected to front and rear differentials 16a and 16b. Front wheels 12a are generally driven by engine 26 of the vehicle. AWD system 8 includes a clutch 20 (though other implementations could include multiple clutches) which, when engaged, can transfer some torque from engine 26 from front wheels 12a to rear wheels 12b via a drive shaft (not shown) enabling all wheels 12 of the vehicle to drive. The status of clutch 20 of AWD system 8 can be adjusted by controller 10 using hydraulic control 24. In order to more accurately drive haydraulic control 24 (and thereby more accurately position clutch 20), controller 10 receives hydraulic pressure data from pressure sensor 22, which indicates the overall hydraulic pressure within AWD system 8. In various embodiments, AWD system 8 may incorporate multiple pressure sensors 22 to provide redundancy. If there are multiple pressure sensors 22, their respective raw signals may be averaged together to determine an average pressure sensed by the pressure sensors 22. Controller 10 may also use data captured from atmospheric sensor 18, such as ambient air pressure, to interpret data captured from pressure 22, as described herein. AWD system 8 also include temperature sensor 23 configure to detect a temperature of the oil within AWD system 8.

A method or an algorithm (see algorithm 100 of FIG. 3, described in detail below) may be executed by an all wheel drive controller (e.g., controller 10 of FIG. 6). The controller may be used to control an all wheel drive system in a vehicle. The controller may have a processor for running the algorithm and memory for storing data. The processor may run the algorithm continuously and may run the algorithm multiple times every second when the controller is powered on. The controller may determine the amount of pressure required to activate an all wheel drive mode, such as by providing sufficient hydraulic pressure to at least partially engage an all wheel drive clutch. The hydraulic pressure may be regulated using a hydraulic fluid pump and a solenoid valve to achieve the desired hydraulic pressure.

The algorithm may calibrate, or correct the value of a raw signal received from the hydraulic fluid pressure sensor to obtain a more accurate pressure sensor reading. The corrected signal may be converted by the controller into a pressure value. The corrected voltage signal may provide a more accurate pressure reading than the raw signal to more accurately control the all wheel drive system and to improve the useful life of the system. The algorithm may correct the voltage signal to compensate for a variety of permanent and/or changing error factors, such as errors due to temperature and atmospheric pressure, and may adjust for manufacturing differences in new sensors and errors related to wear of the sensors over a long period of time. The algorithm may determine when conditions are sufficient to calculate a new offset for the voltage of the pressure sensor and may determine when newly calculated values are with an acceptable range.

The pressure sensor for the all wheel drive system may measure the pressure of the hydraulic fluid within the all wheel drive system. The pressure sensor may have a diaphragm with an inner surface in contact with the hydraulic fluid and with an outer surface in contact with the atmosphere. The hydraulic fluid within the all wheel drive system pushes upon the inner surface of the diaphragm. A larger pressure may result in a larger deflection of the diaphragm, whereas a lower pressure may result in a smaller deflection of the diaphragm. A raw signal may be generated by the pressure sensor, with the raw signal being a function of the amount of pressure (i.e., the amount of deflection of the diaphragm). A higher pressure may produce a higher raw signal through greater outward deflection of the diaphragm, while a lower pressure may produce a lower raw signal through a lesser outward deflection of the diaphragm. The raw signal may be a raw output voltage signal in the case that the pressure sensor is analog and configured to translate a pressure value into a corresponding voltage value. In other cases, the raw signal could be a digital value indicating the pressure sensed by the pressure sensor, for example, in the event that the pressure sensor is digital. The pressure sensor could output its raw signal directly to a vehicle controller, or may communicate its raw signal through a controller area network (CAN), serial data connection, wireless data communication network, or any other suitable communications network.

Referring to FIG. 1, even when the pressure is maintained at a constant value (in this example, 0 MPa) the pressure sensor may experience a variation in the measured raw signal, and accordingly the pressure reading, due to a variety of factors. One primary factor that causes such variation is a change in the temperature of the hydraulic fluid in the all wheel drive system. In many cases, as shown in FIG. 1, the pressure reading variation due to temperature may be non-linear. Additionally, the variation in the pressure sensor reading due to temperature may also vary between different pressure sensors and the amount and/or percentage of variation may change at different temperatures for each pressure sensor.

Figure 2:
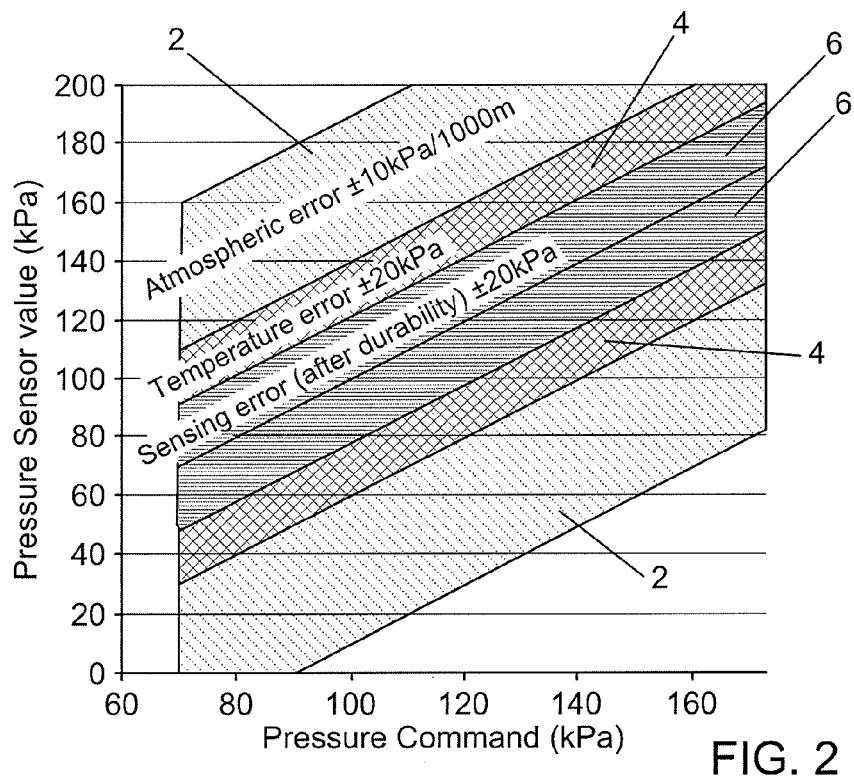
FIG. 2 is a chart showing effects of temperature and atmospheric pressure on the pressure sensor reading.

In addition to temperature variations, there can be other sources of error in pressure sensor reading. FIG. 2, for example, is a chart illustrating several of the sources of error in a pressure sensors for an AWD control system. The vertical axis of the graph of FIG. 2 reflects the pressure value read by the pressure sensor, while the horizontal axis represent the pressure requested by the all wheel drive system. A first set of error bars 2 show variability in the pressure sensor reading that may arise due to atmospheric effect (i.e., variations in ambient pressure due to altitude and air temperature). A second set of error bars 4 indicates the error that may result from temperature effects. Finally a third set of error bars 6 indicates error that may result from initial new part or lifetime durability changes.

The present system and method, therefore, is arranged to implement procedures and algorithms configured to offset or nullify the various sources of pressure sensor reading error described above. This can improve operation of an AWD system in a vehicle by providing more accurate control over a clutch mechanism implemented within the AWD system.

Figure 3:
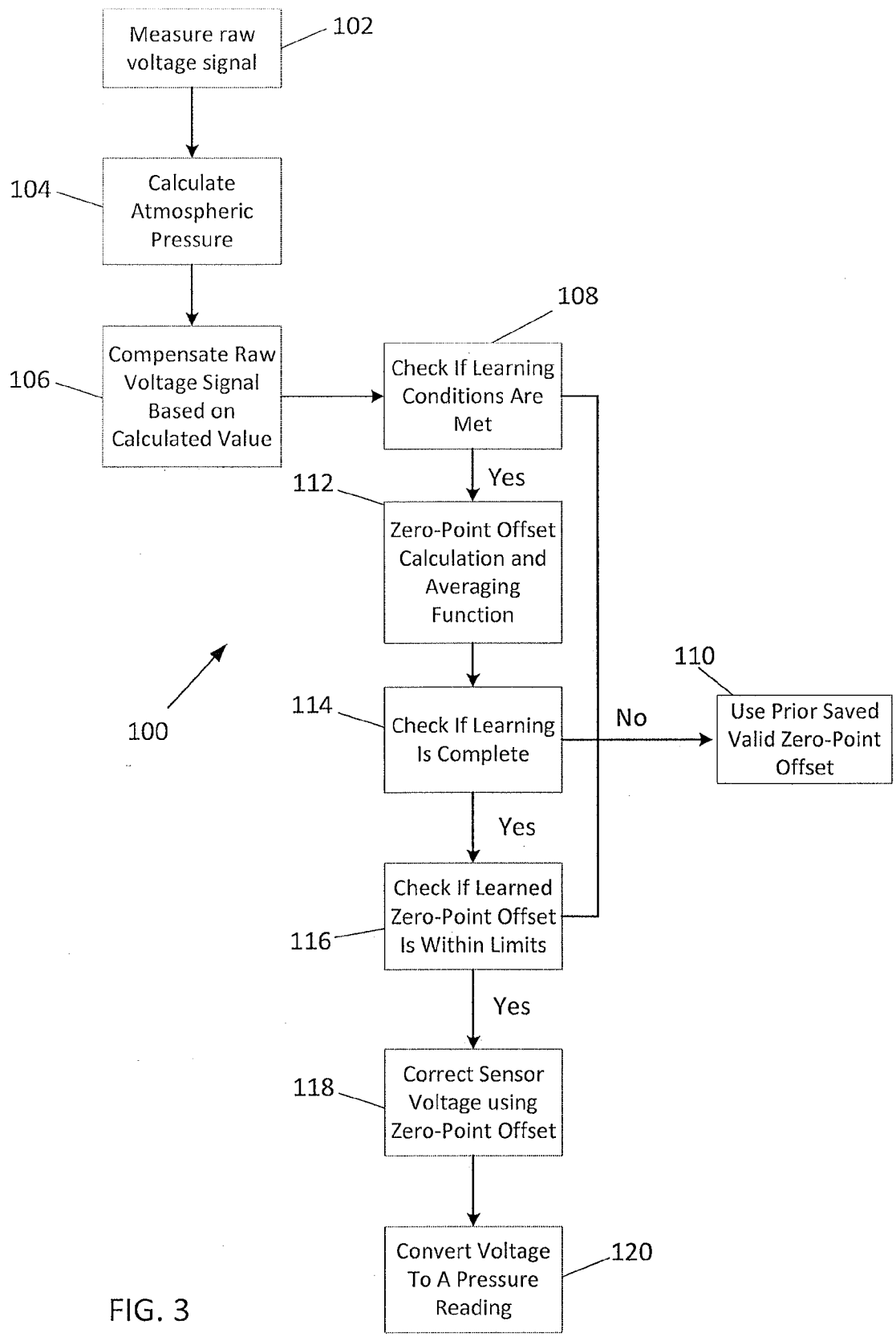
FIG. 3 is a flow chart depicting an example method for correcting a raw output of a pressure sensor and converting a corrected voltage signal into a pressure reading.

Referring to FIG. 3, a flow chart for a pressure sensor calibration algorithm 100 may be executed through an all wheel drive controller for correcting the raw signal from the pressure sensor. The algorithm 100 may be used by the controller, in steps 102, 104, and 106 to compensate for errors in the pressure sensor readings due to atmospheric pressure, such as when the altitude of the vehicle increases or decreases. An increase in atmospheric pressure may exert more pressure on the outer surface of the diaphragm, which may deflect the diaphragm more inward towards the hydraulic fluid, and which may cause the pressure sensor to detect a lesser pressure on the inside of the diaphragm than is actually present. Similarly, a decrease in atmospheric pressure may exert less of a pressure on the outer surface of the diaphragm, which may cause less of an inward deflection of the diaphragm towards the hydraulic fluid, and which may cause the pressure sensor to detect a higher pressure on the inside of the diaphragm than is actually present.

In step 102 the controller may measure a raw signal output from the pressure sensor. The atmospheric pressure is calculated in step 104 by the controller, such as by using the altitude of the vehicle and the ambient temperature. It will be appreciated that alternatively, a separate pressure sensor, such as a barometric pressure sensor, may be used to measure the atmospheric pressure. In step 106, the controller may create an atmospheric pressure compensated voltage signal based on the atmospheric pressure calculated in step 104 and the measured raw signal in step 102. The controller, may for example, increase or decrease the measured raw signal until it reaches a desired value based on the calculated atmospheric pressure. It will be appreciated that the atmospheric pressure compensation steps 102, 104, and 106 may be continuously run by the controller, or may be run periodically, or in response to certain events, such as an idle stop event. It may be important to regularly check the atmospheric pressure, since the altitude of the vehicle may vary significantly during a driving cycle (e.g. hilly or mountainous driving conditions).

Figure 4:
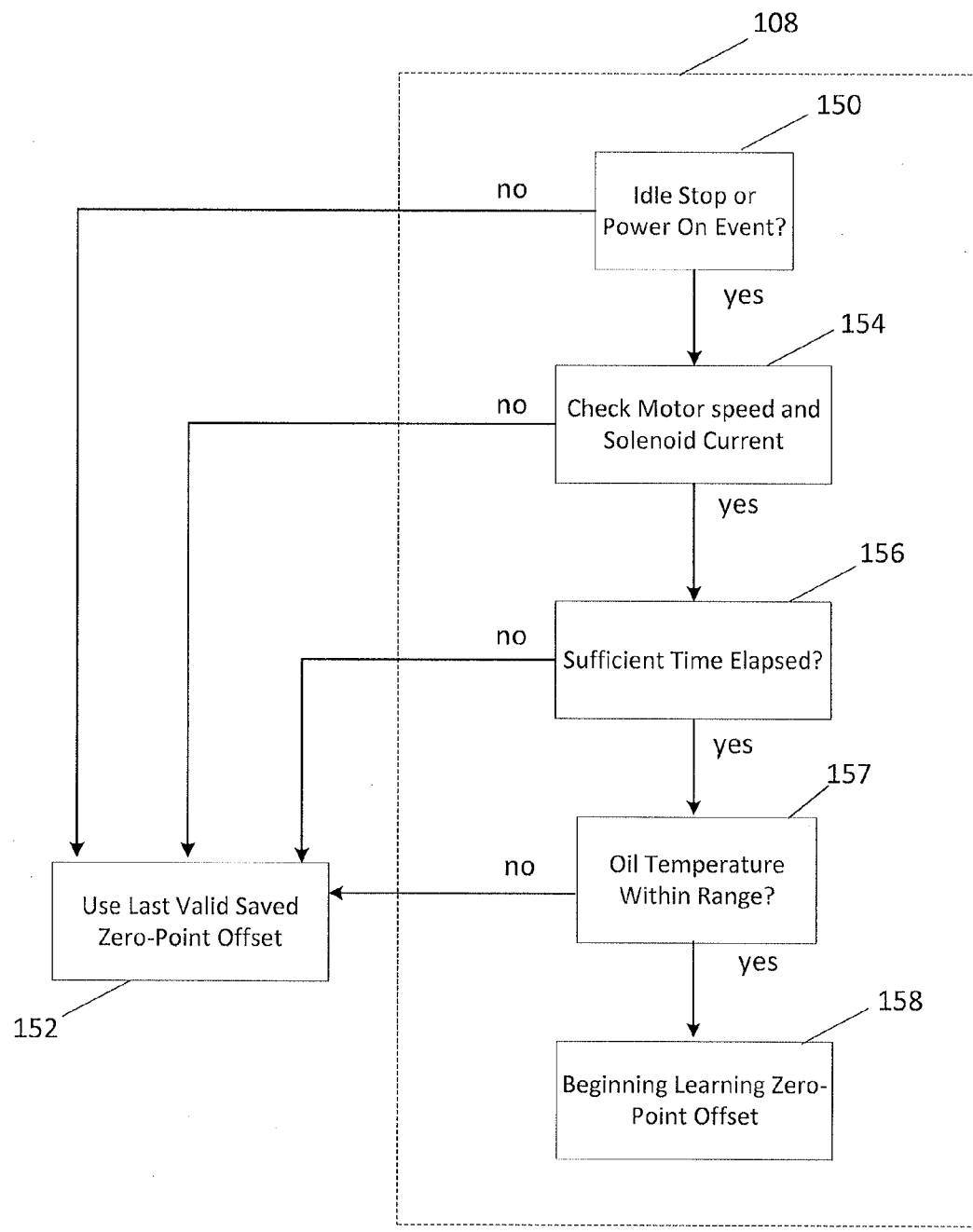
FIG. 4 is a flow chart showing in more detail step 108 of FIG. 3, for checking whether learning conditions for the method are met.

Referring to FIGS. 3 and 4, the controller, using the algorithm 100, may determine in step 108 if adequate learning conditions exist for learning a new zero-point offset for the pressure sensor. Step 108 may include several sub-steps, such as sub-steps 150, 154, 156, and 158. The adequate learning conditions may be a set of predetermined conditions or parameters that may ensure that the pressure of the hydraulic fluid is a known value, such as zero, and when the voltage associated with that pressure reading on the pressure sensor (i.e., an idea voltage) is also known. For example, in sub-step 150 the algorithm 100 checks whether a power on event or an idle stop event has been detected. A power on event may occur, when a vehicle is turned on. At that time, power is supplied to the vehicle's controllers, sensors, and other systems, but the vehicle's engine has not started yet. Conversely, an idle stop event may exist when the vehicle has come to a full stop and the engine is shut off automatically by a controller, such as an engine controller or ECU. During the idle stop event the controller may turn off the all wheel drive system by turning off the hydraulic fluid pump and the solenoid valve, since the all wheel drive system is not needed while the engine is shut down. The ECU may set an idle stop active flag to indicate that the vehicle is in an idle stop event.

If no power on event or idle stop active flag is detected, the algorithm may move to sub-step 152 and may continue to utilize a prior zero-point offset stored in the memory of the controller or an offset value of zero. The prior zero-point offset may have been calculated during the current drive cycle or may have been calculated during a prior drive cycle. When the vehicle is exiting the power on or idle stop event, the engine is turned on and the ECU may set an engine cranking flag to indicate that the engine is starting. This engine cranking flag may be used to interrupt the algorithm 100, which may result in the algorithm 100 using the prior saved zero-point offset or an offset value of zero if the new zero-point offset has not been determined yet.

If a power on or idle stop event is detected in step 150, such as through the idle stop active flag, the controller may move to sub-step 154 to determine if the all wheel drive system is deactivated, such as by checking if the rotational speed of an electric motor for turning the hydraulic fluid pump is zero and if the current supplied to a solenoid valve for controlling flow in the all wheel drive system is also zero. If, in step 150, a power on event was detected rather than an idle stop event, step 154 may be skipped as it may be inferred that at power on the rotational speed of the electric motor for turning the hydraulic fluid pump is zero and the current supplied to the solenoid valve is also zero. In some cases, sub-step 152 may be used to ensure that the pressure of the hydraulic fluid is zero, or is at least decreasing in value towards zero. If the motor speed and solenoid valve current are not zero, then the algorithm 100 may move to sub-step 152 and may utilize the prior saved zero-point offset. If the motor speed and the solenoid current are at the desired value, such as zero, then the algorithm 100 may move to sub-step 156. In sub-step 156, the algorithm 100 may check if a predetermined amount of time has elapsed to provide sufficient time for the pressure of the hydraulic fluid to reach a known pressure value, such as zero, after the all wheel drive system is deactivated and the motor speed and solenoid current are set to zero. In an embodiment, the predetermined amount of time may be approximately 3 seconds. In other embodiments, the predetermined amount of time can be set equal to a maximum amount of time required for a vehicle's all wheel drive system oil pressure to reach zero after being set to a non-zero value. Again, if, in step 150, a power on event was detected rather than an idle stop event, step 156 may be skipped as there may be no requirement to provide time for hydraulic fluid pressure to reach zero—the pressure will already be zero.

If the predetermined amount of time has not elapsed, then the hydraulic fluid may still be fully or partially pressurized rendering any zero-point offset calculation inaccurate. The algorithm 100 may then move to sub-step 152, and the controller may utilize the prior saved zero-point offset. If sufficient time has elapsed, however, then the hydraulic fluid should no longer be pressurized (i.e. the known pressure value has been reached), and the algorithm 100 may move to sub-step 157.

Sub-step 157 checks that the temperature of the oil within the all wheel drive system is within certain boundaries values. For example, sub-step 157 may involve checking that the oil temperature is between −15 degrees Celsius and 110 degrees Celsius. If not, the algorithm 100 may then move to sub-step 152, and the controller may utilize the prior saved zero-point offset. If the oil temperature is within the boundary values, the algorithm 100 may move to sub-step 158 to begin learning a new zero-point offset.

Figure 5:
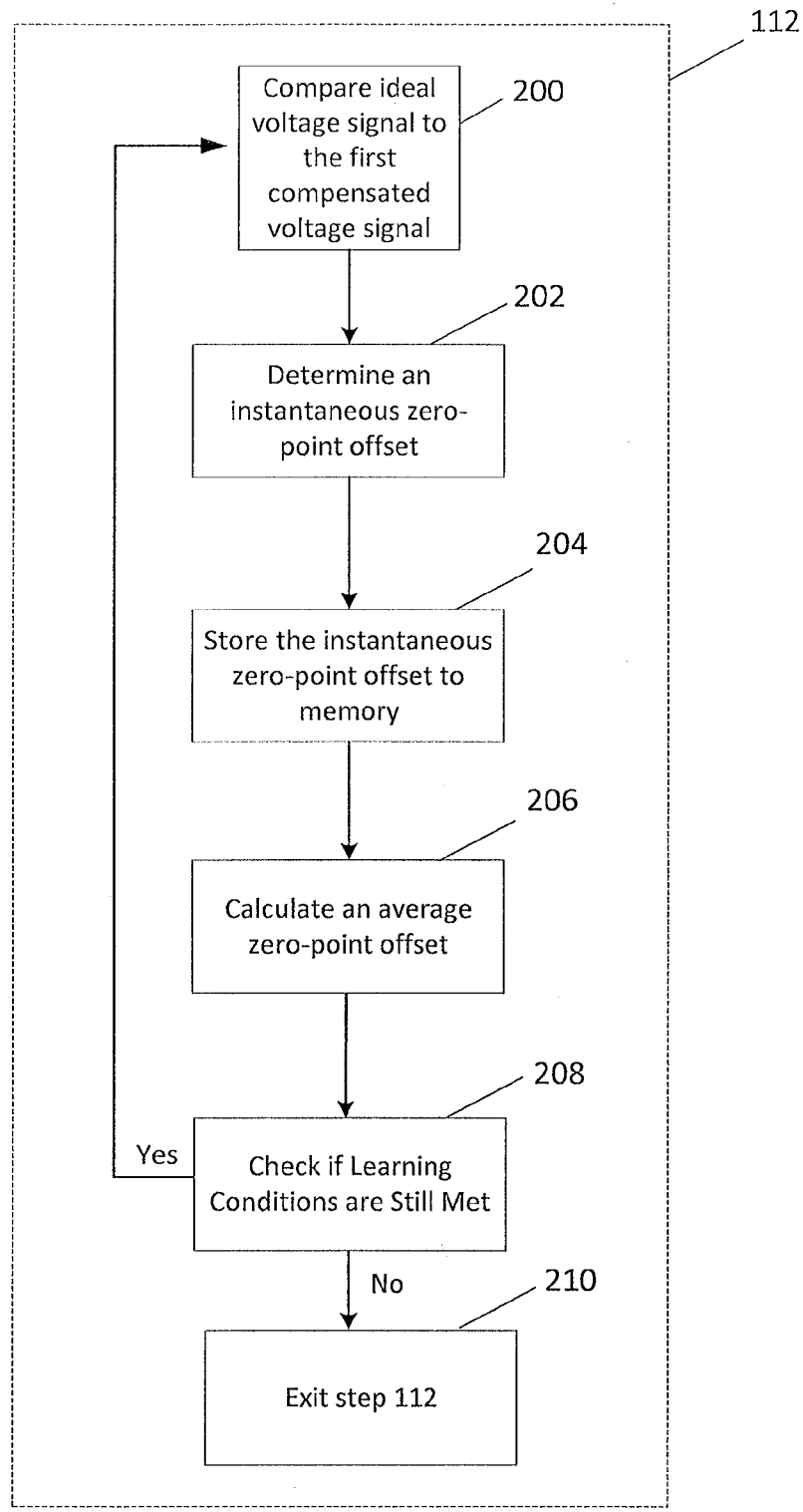
FIG. 5 is a flow chart showing in more detail a step 112 of FIG. 3, for learning a new zero-point offset used in creating the corrected voltage signal.

Returning to FIG. 3, in step 112 the algorithm 100 may begin to learn a new zero-point offset. Step 112 may compare the atmospheric pressure compensated voltage signal to a known voltage signal, or an ideal voltage signal, for the known pressure value, such as when the hydraulic fluid is in an unpressurized state. Additional sub-step details of step 112 are shown in FIG. 5. Referring to FIG. 5, an instantaneous zero-point offset may be calculated in sub-step 202 by subtracting the ideal voltage signal from the atmospheric pressure compensated voltage signal. The instantaneous zero-point offset may be temporarily stored in the memory of the controller in sub-step 204. In sub-step 206 the algorithm 100 may calculate an average zero-point offset based on a plurality of the instantaneous zero-point offsets calculated during the single power on or idle stop event. Alternatively, the average value could be calculated using zero-point offsets identified in prior power on or idle stop events. In sub-step 208 the algorithm 100 may check if the learning conditions previously checked in step 108 are still met. If learning conditions are still met, then the algorithm 100 returns to sub-step 200. If learning conditions are no longer met, then the algorithm 100 moves to sub-step 210 and, returning to FIG. 3, exits step 112. It will be appreciated that the average zero-point offset calculation may be calculated each time a new instantaneous zero-point offset is determined (i.e. a cumulative moving average), or alternatively may be calculated after the vehicle has left the power on or idle stop mode (i.e. a signal average calculation), such as in sub-step 210.

If step 112 is interrupted before the sub-steps 200, 202, 204, and 206 are completed a first time, such as by the engine starting or the vehicle exiting the idle stop mode, such that a new average zero-point offset has not been learned in step 112, then the algorithm may move to step 110, and may utilize the prior saved zero-point offset. Interruption of the algorithm 100 may ensure that the all wheel drive system is available to the driver at all times that the vehicle may be driven. If the controller had sufficient time to calculate an average zero-point offset in sub-step 206, even with only a single instantaneous zero-point offset, then the algorithm 100 moves to sub-step 210 to exit step 112 and move to step 116.

In step 116 the algorithm 100 may check if the new average zero-point offset, calculated in step 112, is within predetermined limits (i.e. a potentially valid value). The predetermined limits may be an upper voltage limit and a lower voltage limit. The predetermined limits may be used to ensure a clearly incorrect new average zero-point offset is not utilized by the controller, which may otherwise damage the all wheel drive system. For example, the algorithm may have predefined lower voltage limits of 0.342V for before engine run and 0.419V during idle stop. and predefined upper limits of 0.659V for before engine run and 0.581V during idle stop. Two upper and lower limits may be defined because, at ignition on, there is a likelihood that the sensor is cold and, therefore, additional error is possible. Idle stop only operates when the vehicle is up to normal operating temperatures (and not at all when the air is extremely cold), so therefore the temperature error during idle stop should be less, so the voltage limits are closer to the nominal voltage of 0.5V. If the new average zero-point offset is between the predefined upper and lower voltage limits, then the algorithm 100 may save the new average zero-point offset to the controller's memory for use in actuating the all wheel drive clutch to control activation and deactivation of the all wheel drive system. The algorithm 100 may then be used to correct the atmospheric pressure compensated voltage signal using the new average zero-point offset in step 118 to obtain a more accurate voltage representation of the hydraulic pressure as measured by the pressure sensor. In step 120 the corrected voltage may be converted to a pressure value by the algorithm 100 using a conversion formula. The pressure value may then be used by the controller in actuating the clutch to control activation of the all wheel drive system.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended the scope be defined by the claims appended hereto. Additionally, the features of various implementing embodiments may be combined to form further embodiments.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for example, comprise one or more physical or logical blocks of computer instructions which may, for example, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, punch card, flash memory, integrated circuits, or other digital processing apparatus memory device.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

This invention is described in preferred embodiments in the description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

What is claimed is:

1. A system of controlling an all wheel drive system in a vehicle, comprising:
   an atmospheric pressure sensor coupled to the vehicle;
   a pressure sensor configured to detect a hydraulic pressure of the all wheel drive system; and
   a controller in communication with the atmospheric pressure sensor and the pressure sensor to control the all wheel drive system of the vehicle configured to:
      determine whether the vehicle is in an idle stop state,
      when the vehicle is in an idle stop state, determine whether at least one predetermined testing condition is met, and
      when the vehicle is in an idle stop state and the at least one predetermined testing condition is met:
      determine an atmospheric pressure from a measured atmospheric pressure by the atmospheric pressure sensor,
      measure a raw output from the pressure sensor,
      determine a zero-point offset by comparing the atmospheric pressure, the raw output, and a known pressure value present when the at least one predetermined testing condition is met,
      create a corrected pressure reading using the zero-point offset and a second raw output from the pressure sensor, and
      use the corrected pressure reading to control activation of the all wheel drive system of the vehicle.

2. The system of claim 1, including a temperature sensor configured to detect a temperature of the all wheel drive system.

3. The system of claim 2, wherein determining the zero-point offset includes using a temperature from the temperature sensor to determine the zero-point offset.

4. The system of claim 1, wherein creating the corrected pressure reading includes subtracting the zero-point offset from the second raw output.

5. The system of claim 1, wherein the at least one predetermined testing condition includes a threshold rotational speed of a hydraulic pump connected to the all wheel drive system.

6. The system of claim 1, wherein the at least one predetermined testing condition includes a threshold time duration since a hydraulic pump connected to the all wheel drive system was instructed to operate.

7. The system of claim 6, wherein the threshold time duration is at least three seconds.

8. The system of claim 1, wherein the at least one predetermined testing condition includes a current level supplied to a solenoid valve of the all wheel drive system.

9. A system of controlling an all wheel drive system in a vehicle, comprising:
   an atmospheric pressure sensor coupled to the vehicle;
   a pressure sensor configured to detect a hydraulic pressure of the all wheel drive system; and
   a controller in communication with the atmospheric pressure sensor and the pressure sensor to control the all wheel drive system of the vehicle configured to:
      determine whether the vehicle is in an idle stop state,
      when the vehicle is in an idle stop state:
      determine an atmospheric pressure from a measured atmospheric pressure by the atmospheric pressure sensor,
      measure a raw output from the pressure sensor,
      determine a zero-point offset by comparing the atmospheric pressure, the raw output, and a known pressure value present when the at least one predetermined testing condition is met,
      create a corrected pressure reading using the zero-point offset and a second raw output from the pressure sensor, and
      use the corrected pressure reading to control activation of the all wheel drive system of the vehicle.

10. The system of claim 9, including a temperature sensor configured to detect a temperature of the all wheel drive system.

11. The system of claim 10, wherein determining the zero-point offset includes using a temperature from the temperature sensor to determine the zero-point offset.

12. The system of claim 9, wherein creating the corrected pressure reading includes subtracting the zero-point offset from the second raw output.

13. A method of controlling an all wheel drive system in a vehicle executed by a controller having a processor and a memory, the method comprising:
   determining whether the vehicle is in an idle stop state,
   when the vehicle is in an idle stop state, determining whether at least one predetermined testing condition is met, and
   when the vehicle is in an idle stop state and the at least one predetermined testing condition is met:
   determining an atmospheric pressure from a measured atmospheric pressure by an atmospheric pressure sensor coupled to the vehicle,
   determining a raw output from a pressure sensor configured to detect a hydraulic pressure of the all wheel drive system,
   determining a zero-point offset by comparing the atmospheric pressure, the raw output, and a known pressure value present when the at least one predetermined testing condition is met,
   determining a corrected pressure reading using the zero-point offset and a second raw output from the pressure sensor, and
   using the corrected pressure reading to control activation of the all wheel drive system of the vehicle.

14. The method of claim 13, wherein determining the zero-point offset includes using a temperature from a temperature sensor to determine the zero-point offset.

15. The method of claim 13, wherein creating the corrected pressure reading includes subtracting the zero-point offset from the second raw output.

16. The method of claim 13, wherein determining whether the at least one predetermined testing condition is met includes determining a threshold rotational speed of a hydraulic pump connected to the all wheel drive system.

17. The method of claim 13, wherein determining whether the at least one predetermined testing condition is met includes determining a threshold time duration since a hydraulic pump connected to the all wheel drive system was instructed to operate.

18. The method of claim 17, including determining that the threshold time duration is at least three seconds.

19. The method of claim 13, wherein determining whether the at least one predetermined testing condition is met includes determining a current level supplied to a solenoid valve of the all wheel drive system.

20. The method of claim 13, including controlling an all wheel drive system clutch configured to selectively control an amount of torque transmitted from a transmission of the vehicle to at least one wheel of the vehicle using the corrected pressure reading.

* * * * *